April 7, 1970     O. LUTHI     3,504,802
ROTARY DRUM FILTER

Filed May 8, 1968     2 Sheets-Sheet 1

INVENTOR
OSCAR LUTHI
BY
*Frank H. Thomas*
ATTORNEY

INVENTOR
OSCAR LUTHI
BY
Frank H Thomson
ATTORNEY

United States Patent Office 3,504,802
Patented Apr. 7, 1970

3,504,802
ROTARY DRUM FILTER
Oscar Luthi, Nashua, N.H., assignor to Improved Machinery, Inc., Nashua, N.H., a corporation of Delaware
Filed May 8, 1967, Ser. No. 636,758
Int. Cl. B01d 33/06
U.S. Cl. 210—404    12 Claims

ABSTRACT OF THE DISCLOSURE

An open cylinder decker or rotary drum filter mounted for rotation in a slurry containing bath. The filter includes a central core having a spider mounted on the core. Loosely mounted on the core are a plurality of hollow plastic modular sections secured together to form a drum. There is a modular section on each side of the spider arranged so that as the core is rotated, the spider drives the plastic modular sections from a point near the outer periphery of the drum. The modular sections are provided with holes to allow liquid to pass into the inside of the drum. The modular sections have openings to provide interconnecting passages between the sections. There may be a filtrate outlet at either or both ends of the drum.

BACKGROUND OF THE INVENTION

This invention relates to rotary drum filters and more particularly to a rotary drum filter of the gravity type having a modular design.

In prior open cylinder deckers or drum filters the cost of construction was found to be relatively high. For this reason gravity type drum filters have lost popularity in the pulp industry in favor of more sophisticated filters such as vacuum drum filters, valveless drum filters and disc filters. Some prior open cylinder deckers were made by providing a core or shaft which was journaled in the vat. A plurality of spiders were mounted on the core or shaft. One method of manufacture provided a plurality of rods interconnecting these spiders to form an open drum. A wire screen or mesh acting as a filter was secured to these rods to close the drum. Another form of construction included a central shaft with a plurality of spiders extending outwardly from the shaft. A plate having a plurality of large openings therein was placed over the spiders. A wire screen was then secured to the top of this plate to act as the filtering device. As was stated hereinbefore these constructions proved to be costly. When varying temperature liquids were used, expansion and contraction caused problems which led to poor filtering.

SUMMARY

It is therefore the principal object of this invention to provide a rotary drum filter which is lower in construction cost and easier to maintain than prior drum filters.

It is another object of this invention to provide a rotary drum filter which eliminates problems caused by thermal expansion and contraction.

It is a further object of this invention to provide a rotary drum filter which allows filtrate to be drained from both ends of the drum.

In general, the aforementioned objects are carried out by providing a rotary drum filter which includes a core with a least one spider secured to the core. A plurality of hollow modular sections are juxtaposed on the core to form a drum. At least one of the modular sections is positioned adjacent to the spider. Means are provided for securing each modular section to an adjacent modular section. Each of the modular sections has a plurality of holes in its outer periphery for allowing fluid to flow into the inside of the modular sections. The modular section is of a generally wheel like configuration with a hub, spokes, and an outer rim with the modular section being hollow and the rim having a plurality of holes therethrough.

BRIEF DESCRIPTION OF THE DRAWINGS

The foregoing and other objects will become apparent from the following description and drawings wherein.

DESCRIPTION OF THE PREFERRED EMBODIMENT

Figure 1:
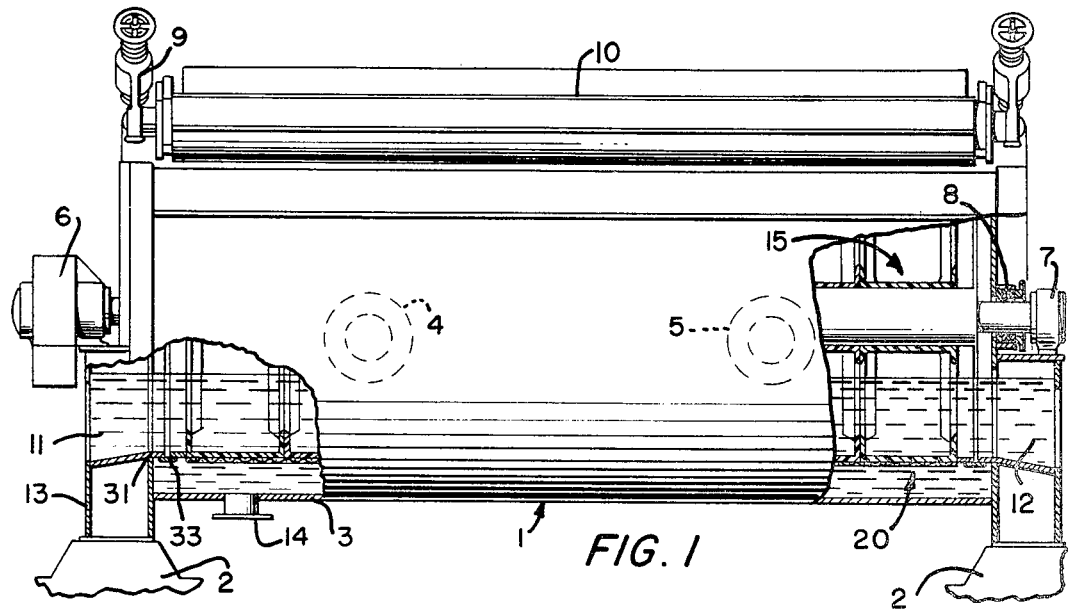
FIG. 1 is a plan view of a filtering device in accordance with this invention with certain parts being broken away and sectioned.

Referring to the drawings and in particular to FIG. 1 there is shown a rotary drum filter generally indicated at 1. This filter includes a slurry containing bath 3 which has a pair of legs 13 supported by pedestals 2. The bath includes a pair of inlets 4 and 5 and a motor 6 for rotating the drum filter. The drum includes a main shaft or core generally indicated at 15 which is journaled at one end at 7. Seal means 8 is provided for preventing leakage. As is conventional in drum filters there is a take-off roll indicated at 10 with spring press means 9. The bath includes a pair of outlets for filtrate indicated at 11 and 12. Should it be necessary to empty the bath 3, a drain 14 has been provided.

Figure 2:
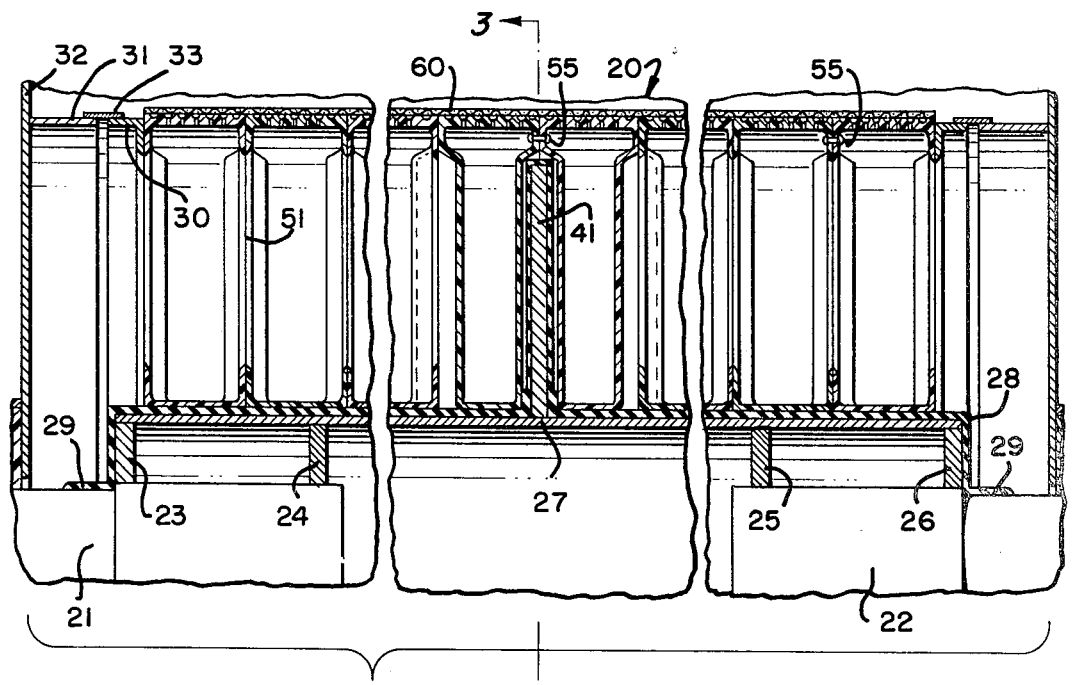
FIG. 2 is a sectional elevational view of the rotary drum filter of this invention with the central portion taken on the line 5—5 of FIG. 3 and the end portions taken on the line 4—4 of FIG. 3.

As best shown in FIG. 2, the core 15 includes a pair of journaled ends indicated at 21 and 22. A pair of annular rings 23, 24, and 25, 26 are secured to each of these ends 21 and 22. A tubular sleeve 27 is secured to the outer periphery of these rings. The tubular sleeve 27 is preferably covered with fiberglass or other noncorrosive material indicated at 28. This material extends around the tubular member 27 to form a pair of lips 29 to prevent leakage into the inside of the core.

Figure 3:
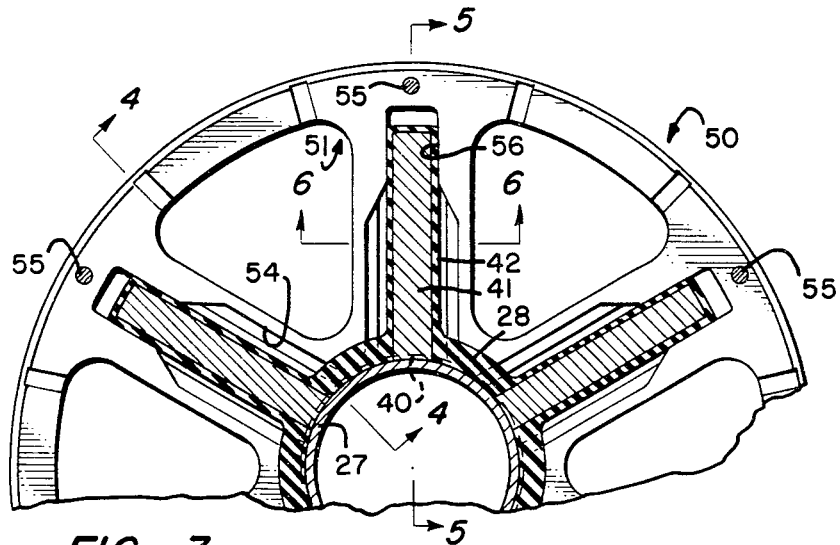
FIG. 3 is a sectional view taken on the line 3—3 of FIG. 2.
Figures 4, 5:
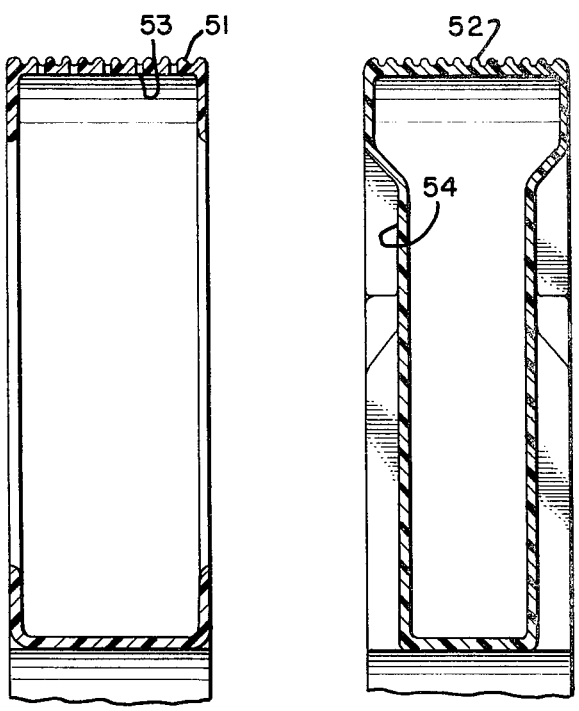
FIG. 4 is a sectional view of a single modular section taken on the line 4—4 of FIG. 3 with the spider removed.
FIG. 5 is a sectional view of a single modular section taken on the line 5—5 of FIG. 3 with the spider removed.
Figure 6:
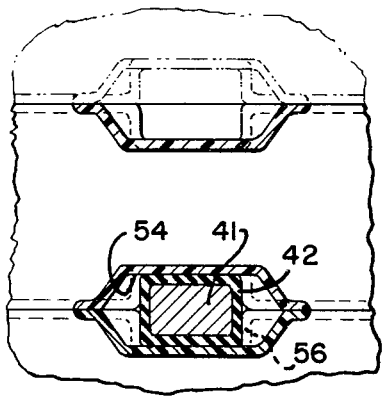
FIG. 6 is a sectional view taken on line 6—6 of FIG. 3.

A spider indicated at 40 is secured to the tubular sleeve 27 and thus the core 15. This spider includes a hub and a plurality of arms indicated in FIG. 3 at 41. The spider arms may also be covered with a fiberglass or rubber material 42. A plurality of hollow plastic modular filtering sections generally indicated at 50 are loosely mounted or stacked on the core 15 and secure to each other by means of rivets 55, only two of which are shown in FIG. 2, to form the drum. If desired, these modular sections may be bonded together with a suitable adhesive rather than using rivets. At least one and preferably two of the modular sections are mounted adjacent the spider 40. As indicated in FIG. 6 by having two of the modular sections mounted on opposite sides of the spider 40, there is provided a driving means for the drum, i.e., as the core is rotated the spider is also rotated and this rotation is transferred from the spider arms 41 to the modular sections and thus the drum.

The end modular section 50 has an end piece 30 secured to it by either rivets or a bonding agent. The bath 3 has side walls 32 which has secured thereto a tubular extension 31. The end piece 30 and tubular extension are aligned but spaced from each other. A deckle band seal 33 allows the drum to rotate relative to the bath or vat 3 and extension 31 but prevents communication between the vat and the inside of the drum. Since the extension 31 forms a part of the outlets 11 and 12. the deckle band also prevents leakage of slurry into the filtrate outlet. If desired, other forms of seals may be used.

Preferably, although not necessarily, the modular sections 50 are made of a plastic material. Each of these modular sections is cylindrical in shape and provided with a plurality of passages 51 which, when the drum is assembled, are substantially aligned with each other to provide a connecting flow passage completely through the entire drum. Each of the spokes of the modular sections is provided with depressions 54 having a reduced cross-section 56. The depressions 56 normally serve to add stiffness to the modular sections. In the central sections, the depressions 54 receive the spider arms 41. The smaller section 56 serves to firmly grip the arms 41, FIG. 6. The outer periphery or rim of the cylindrical sections is ribbed or corrugated at 52. In the troughs of the corrugations 52 there are a plurality of openings 53. A screen indicated at 60 in FIG. 2 is provided to completely cover the entire drum surface.

The gravity drum filter of this invention operates essentially in the usual manner. The core and thus the entire drum is rotated by the motor 6. The bath is filled with slurry to a point considerably above the axis of the drum. Since the liquid level is high, the filtrate will flow by gravity through the screen 60 along the troughs 52 and through the openings 53 in the modular sections. The filtrate then enters the modular sections and passes through the openings 51 to the outlets of the vat indicated at 11 and 12. The filtrate may then be piped off to any suitable tank or disposed of. Although two outlets 11, 12 have been shown, if desired, one end of the drum may be blanked off so that filtrate exits from only one end.

The mat formed on the drum is picked off by a smooth couch roll 10 which is pressed against the drum by spring press means 9. The pulp sheet sticks to the couch roll and is then doctored off by a suitable scrapper blade (not shown).

Since the spider 40 extends into the cut out portion 54 of the modular sections and the opening 56 is approximately the same size as the spider arms 41, the drum is driven from a point near the outer periphery of the drum. This, combined with the fact that the modular sections are loosely mounted on the core 15, provides a driving means which does not interfere with radial thermal expansion and contraction. As constructed, the unit provides an open cylinder decker which is stiff because of the steel core and provides minimum deflection without interferring with the axial thermal expansion and contraction of the molded plastic sections. The circumferential corrugations 52 provide for support of the wire face as well as flow paths for the filtrate to the holes 53 which lead to the inside of the modular sections.

By the use of modular sections it has been found that the device may be made of a plastic material and the modular sections can be molded in one piece thus providing greater flexibility. The plastic construction allows easy cleaning of the device. If a longer drum filter is to be manufactured, it is merely necessary to provide a longer bath and add additional modular sections. If the length of the drum is to be decreased, a shorter bath may be provided with a fewer number of modular sections. Since the modular sections are all duplicates of each other, the cost of manufacturing a variety of drum lengths decreases. This is opposed to the prior devices where if a longer drum is to be made, all parts must be increased in size. Because a pair of journaled members 21 and 22 are used, if the length is to be increased, it is merely necessary to increase the length of the tubular core member 27 and add additional modular sections. With the modular sections, if a portion of the drum is damaged, it can easily be repaired without replacing the entire drum simply by replacing one or more sections.

Although I have shown only one driving spider placed in the center of the drum, it may be desirable to have more than one. For example, in a longer filter, it may be desirable to have one spider near each end of the drum either with or without a central spider. If more than one spider is used, however, the additional driving spiders must be mounted on the core so that they can move axially to permit thermal expansion and contraction.

I claim:

1. In combination with a slurry containing bath, a rotary drum filter for removing solid material from said slurry comprising:
   a core journaled for rotation in said bath;
   means for rotating said core;
   a spider secured to said core;
   a plurality of hollow modular sections each having an axial bore therethrough juxtaposed on said modular sections positioned adjacent said spider;
   the bore in each of said modular sections being dimensioned so that it is slightly larger than said core so that the modular sections are loosely mounted on said core; and
   means securing each modular section to an adjacent modular section;
   at least two adjacent modular sections combining with each other to form a recess through which said spider extends so that the rotation of said core is transferred through said spider to rotate the drum;
   each of said modular sections having a plurality of holes therein for allowing the liquid of the slurry to flow into the inside of said modular sections.

2. The combination of claim 1 wherein each of said modular sections includes at least one passage substantially aligned with a similar passage in an adjacent modular section for connecting the inside of said modular section and the inside of the adjacent modular section.

3. The combination of claim 2 wherein said modular sections are cylindrical in shape and said spider has a hub and a plurality of fingers extending outwardly therefrom which fit between adjacent modular sections so that the drum is driven from a point near its outer periphery.

4. The combination of claim 3 including screen means mounted around the outer periphery of said drum and said core is covered with a noncorrosive material.

5. The combination of claim 4 wherein said modular sections are secured to each other by means of rivets.

6. The combination of claim 4 wherein said modular sections are bonded together.

7. The combination of claim 4 wherein said drum filter has outlets at both ends for discharging filtrate.

8. The combination of claim 7 including seal means between said drum and said slurry containing bath for preventing filtrate from mixing with said slurry.

9. A rotary drum filter comprising:
   a core;
   a plurality of hollow, ring shaped modular sections juxtaposed on said core to form a drum;
   at least two of said sections combining with each other to form a recess;
   a spider mounted on said core having a plurality of radially extending fingers which extend into said recess; and
   means for securing adjacent modular sections to each other;
   each of said sections having a plurality of holes in its outer periphery for conducting fluid into the inside of the section;

each of said modular sections having at least one passage substantially aligned with a similar passage in an adjacent modular section for connecting the inside of said modular section with the inside of the adjacent modular section so that fluid which enters the inside of the modular section can flow to an end of the drum through the inside of the drum.

10. The drum filter of claim 9 wherein said modular sections have an axial bore therethrough which is dimensioned so that it is larger than said core so that said modular sections are loosely mounted on said core.

11. The drum filter of claim 10 including screen means mounted on the outside of said drum covering said holes for filtering solids out of liquid which flows through said holes.

12. The drum filter of claim 11 wherein said modular sections are plastic.

References Cited

UNITED STATES PATENTS

| | | | |
|---|---|---|---|
| 1,318,464 | 10/1919 | Schweizer | 159—10 X |
| 2,685,235 | 8/1954 | Lindblad | 210—402 X |
| 3,013,666 | 12/1961 | Krynski | 210—402 X |

REUBEN FRIEDMAN, Primary Examiner

T. A. GRANGER, Assistant Examiner

PO-1050
(5/69)

UNITED STATES PATENT OFFICE
CERTIFICATE OF CORRECTION

Patent No. 3,504,802      Dated April 7, 1970

Inventor(s) Oscar Luthi

It is certified that error appears in the above-identified patent and that said Letters Patent are hereby corrected as shown below:

Column 4, line 24 of the Patent,

After "said" insert --

-- core to form a drum with at least one of said ----

SIGNED AND
SEALED
OCT 20 1970

(SEAL)
Attest:

Edward M. Fletcher, Jr.
Attesting Officer

WILLIAM E. SCHUYLER, JR.
Commissioner of Patents